Jan. 8, 1946.  J. CASALINO  2,392,459
CUTTING MECHANISM FOR MOLDED PLASTICS
Filed April 4, 1942  2 Sheets-Sheet 1

INVENTOR
BY Joseph Casalino
Pineles & Greene
ATTORNEYS

Jan. 8, 1946.  J. CASALINO  2,392,459
CUTTING MECHANISM FOR MOLDED PLASTICS
Filed April 4, 1942  2 Sheets-Sheet 2

INVENTOR
Joseph Casalino
BY Pineles & Greene
ATTORNEYS

Patented Jan. 8, 1946

2,392,459

UNITED STATES PATENT OFFICE 2,392,459

CUTTING MECHANISM FOR MOLDED PLASTICS

Joseph Casalino, Elmhurst, Long Island, N. Y., assignor to Joseph H. Meyer Brothers, Brooklyn, N. Y., a corporation of New York Application April 4, 1942, Serial No. 437,654

1 Claim. (Cl. 164—86)

My invention relates to a method of cutting a plastic branch having a multiplicity of attached molded beads and more particularly my invention relates to a method and apparatus for cutting off the separate beads from a relatively large element having attached thereto a multiplicity of formed plastic molded beads.

The plastic element having the multiplicity of beads molded thereon may be formed according to the method set forth in my copending application Serial No. 437,653.

It is the object of the present invention to rapidly and efficiently cut off the multiplicity of molded beads formed on a molded branch element so that the beads can be tumbled to smooth spherical form.

It is a further object of the present invention to cleanly and without splitting cut small beads attached to a larger molded element.

It is a further object of the present invention to so cut various beads from a larger molded element so that the beads after cutting are positioned so that they can be quickly removed from the apparatus.

These and further objects of my invention will become apparent from a consideration of the drawings, a description of which here follows.

Figure 1:
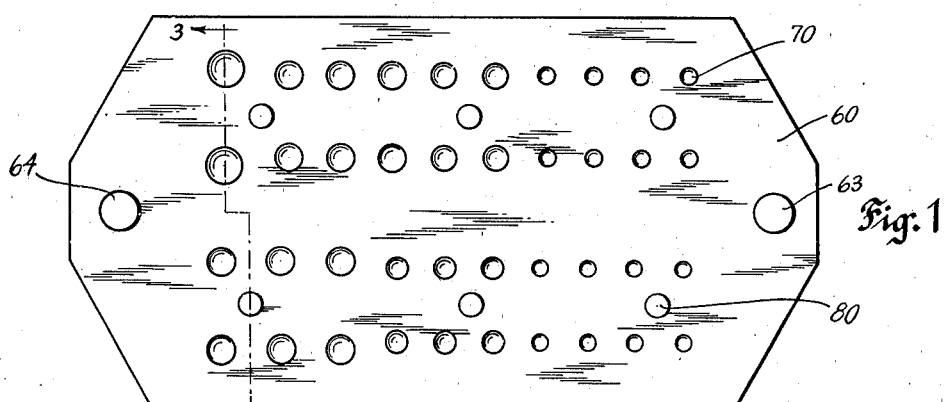
Figure 1 is a bottom view of the upper half of the cutting apparatus of my invention.
Figure 2:
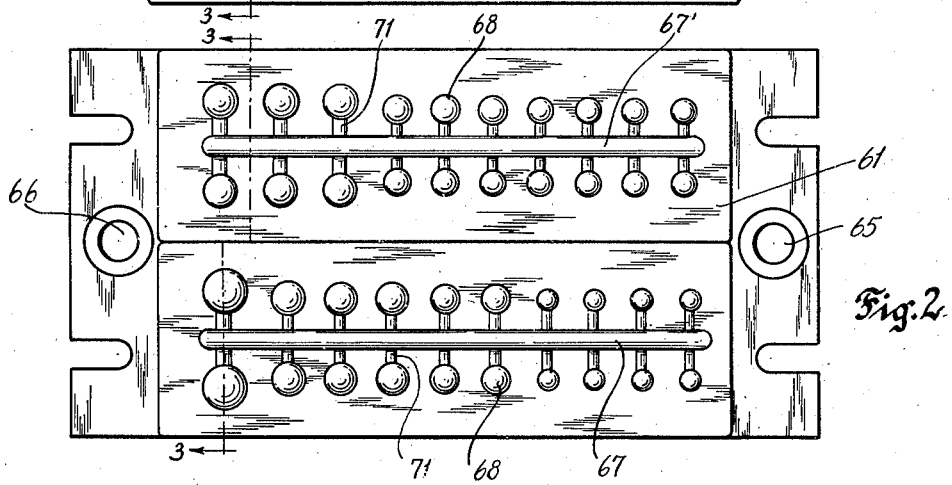
Figure 2 is a plan view of the lower half of the cutting apparatus of my invention showing the molded plastic branch element placed in position for cutting.

Referring now to Figure 1 I show a cutting or shearing apparatus comprising an upper section 60 and a lower section 61. The upper section 60 is adapted to move vertically with respect to the lower section 61 and is guided in that path of movement by means of larger guide pins 63 and 64 which move in guide sleeves 65 and 66. The molded branch elements, generally denoted as 67 and 67', are laid in the shaped out portion of the lower die 61 so that the various beads 68 lie over openings in the lower die 61 which will be more particularly explained hereinafter, particularly in connection with Figures 4 and 5.

Figures 3, 4:
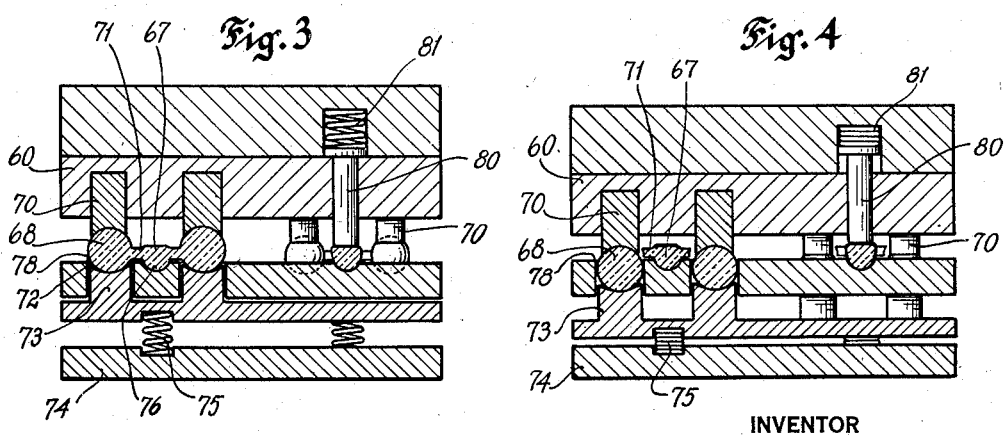
Figure 3 is a detailed cross section taken along the line 3—3 of Figure 1 showing the beginning of the shearing or cutting operation by which the beads are cut from the branch element.
Figure 4 is a cross sectional showing similar to Figure 3 except that the stage shown is after the beads have been sheared from the branch element.

Fixed in the upper die 60 are various punch pins 70 which project downwardly from the upper die 60 and are positioned to contact and press the molded beads 68 as shown in Figures 3 and 4. The bottom portion of these punch pins 70 are concave so as to fit over and properly engage the spherical upper portion of the plastic bead 68.

Figures 5, 6:
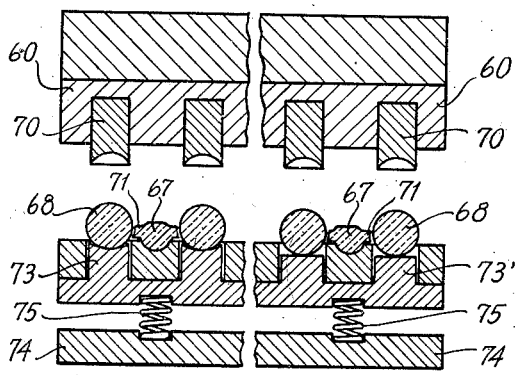
Figure 5 is a cross sectional showing similar to Figure 3 but showing the sheared off beads after cutting and after they have been returned to the upper surface of the bottom half of the cutting element.
Figure 6 is a cross section of a modified form of my invention in which the beads are cut off by the cutter element and ejected by flat bottomed supports.

For the further details of the structure of the apparatus of my invention and the operation thereof, attention is now directed to Figures 3, 4, and 5.

As shown in Figure 3, the punch pins 70, which are positively fixed in the upper die 60, are adapted to contact and closely engage the molded beads 68 which are molded as an integral portion of the branch element generally denoted as 67. The branch element consists generally of a central stem from which extends small sprues 71 at the end of which are located the plastic bead 68.

The plastic bead 68 is initially located over the opening 72 in the lower half die 61 and in this opening 72 are disposed certain supporting elements 73 which are yieldably supported on the plate 74 by the spring 75.

The operation of my apparatus is as follows:

The plastic branch element generally denoted as 67 is set in place so that the central stem lies in a suitably shaped groove 76, with the plastic bead 68 lying over openings 72. The upper half of the die 60 is then brought down under pressure, its path being guided by the engagement of the guide pins 63 and 64 in the guide sleeves 65 and 66.

The punch pin 70 in the course of its downward path contacts the upper portion of the plastic bead 68 and exerts a downward pressure thereon. The openings 72 in the bottom die 61 are so constituted that the edges 78 of these openings are shearing surfaces.

Accordingly, under the influence of the downwardly exerted pressure of the pin 70, the edges 78 shear the plastic bead 68 from the sprues 71. The sheared off bead 68 is then forced down by the punch pin 70, compressing the spring 75 and moving the supporting element 73 down against the resistance of the spring 75.

As shown in Figure 4 after the shearing is completed the sheared plastic bead 68 lies well within the opening 72, the pin 80 absorbing the shock through the spring 81.

After the completion of the downward path of the punch pins 70, the upper half 60 of the die moves upwardly again drawing the punch pin 70 and releasing the plastic bead 68 as shown in Figure 5. This release allows the supporting element 73 to move upwardly through the action of the spring 75 and bring the bead 68 flush with the upper surface of the lower die element 61. The loose bead 68 then can be easily brushed off the surface of the die element 61 for the collection of the beads and for the preparation of the next succeeding operation.

In Figure 6 I show a modified form of my invention, the modification comprising a variation in the supporting element. As opposed to the supporting element 73 shown in Figure 5, the supporting element 73' in Figure 6 has a plane or flat surface so that the beads when cut off are ejected by this flat bottom support 73' and can easily be brushed therefrom since they do not set in any groove as shown in Figure 5.

Accordingly with the apparatus shown and by the method outlined herein, I shear off simultaneously a multiplicity of plastic beads of a molded branch element, the beads being so sheared that the irregular spot on the surface of the plastic bead can be removed by the tumbling operation.

The beads, after shearing, are returned to the relatively flat upper surface of the lower die element so that they can be brushed off into a receptacle and the die surface thus quickly prepared for a new operation.

Figure 7:
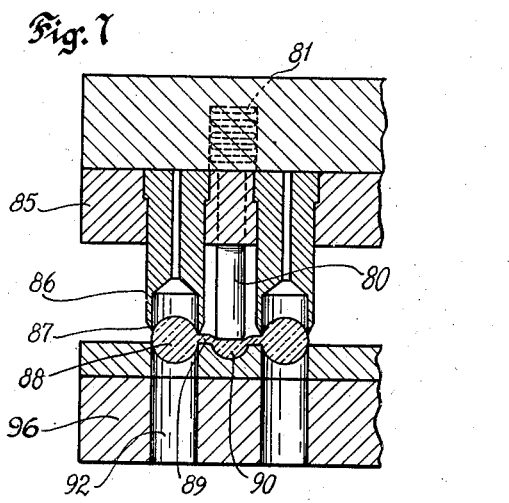
Figure 7 is a cross section showing the modified process of my invention when the beads are about to be cut off from the branch element.
Figure 8:
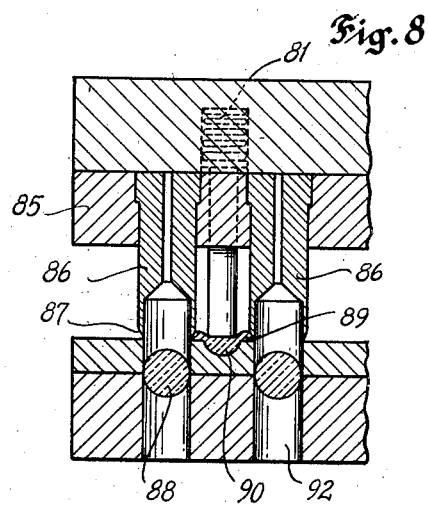
Figure 8 is a cross section showing a still further stage in the modified form of my invention shown in Figure 7.
Figure 9:
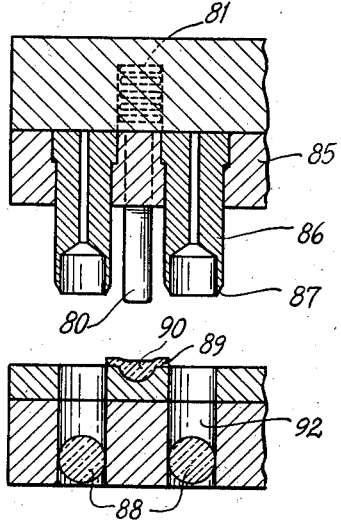
Figure 9 is a cross section showing a still further stage in the modified form of my invention shown in Figures 7 and 8.

According to the modified form of my invention shown in Figures 7, 8 and 9, I employ an apparatus comprising an upper die 85 and a lower die 96. Attached to the upper die 85 are cutting elements 86 which have sharp cutting edges 87 which are adapted to cut the plastic beads 88 from the attached sprues 89. The plastic element generally referred to as 90 rests on the lower die 96 with its central stem in a proper groove in the lower die 96. The path of the upper die 85 with respect to the lower die 96 is governed by guide pins. After the plastic beads 88 are severed from the sprues 89 they drop through the opening 92 in the lower die 86 and are collected below.

For the next operation the machine need be prepared only by removing the central strip and sprues remaining after the separation of the plastic beads from the branch element 90.

In Figures 7, 8 and 9 I show the successive steps in the operation, Figure 7 showing the apparatus just before the cutter edge 87 of the lower die 96 is about to cut through the connecting element which connects the bead 88 to the branch element 90; Figure 8, showing the cutting completed with the ball partially fallen down through the opening 92 in the die 86; Figure 9, showing the upper die withdrawn and the apparatus about to be prepared for the next operation by removal of the branch element 90.

The cutting operation described hereinabove must be carried on within five seconds of the termination of the molding operation described in my copending application referred to above because of the fact that after that time the shrinkage that takes place in the plastic molded branch-like element will prevent the proper fit of the molded plastic element in the cutting die. This five second cycle interval between the withdrawal of the plastic element from the injection molding machine and its cutting is extremely important for obtaining the desired results according to my invention.

I use the terms "sprue" and "gate" interchangeably herein for denoting the member that connects the molded plastic objects, such as the bead, with the central element. This sprue or gate is, of course, molded integrally with the central element and the plastic molded object.

The pin 80 which is backed by the spring 81 serves the dual function of (1) resiliently pressing upon the central portion 67 of the molded branch element and thus keeping it maintained in proper position for the cutting operation, and (2) absorbing the shock of the shearing operation.

According to the present invention I can cut simultaneously a large number of plastic molded objects such as beads or spheres from a large branch-like plastic assembly, the cutting being carried out evenly and accurately so that the subsequent operation of removing the sprue from the severed plastic object can be easily carried out.

By returning the severed plastic objects to the upper face of the lower member of the cutting apparatus, I enable the operation cycle to be greatly shortened since the cutting apparatus can be rapidly prepared for the subsequent operation by brushing off the severed plastic objects and removing the residual portions of the plastic element.

Various other modifications of the invention will suggest themselves to those skilled in the art. I accordingly desire that in construing the breadth of the appended claim they shall not be limited to the specific details shown and described in connection with the above explanation.

I claim:

An apparatus for cutting plastic objects from a plastic element having a plurality of plastic objects attached thereto by gates which comprises a first section having a plurality of openings therein, said openings being at least as large as the diameter of the plastic objects to be cut; a second section, punch pins mounted in said second section; said first section having a groove for properly locating a portion of said plastic element on said first section; and means for pressing said punch pins toward said openings in said first section to separate said plastic objects from said plastic element.

JOSEPH CASALINO.